United States Patent [19]

Fujita et al.

[11] Patent Number: 5,013,231
[45] Date of Patent: May 7, 1991

[54] CONTROL SYSTEMS FOR INJECTION MOLDING MACHINES

[75] Inventors: Shigeru Fujita; Hiroshi Kanno; Takashi Kamiyama, all of Numazu, Japan

[73] Assignee: Toshiba Kikai Kabushiki Kaisha, Tokyo, Japan

[21] Appl. No.: 405,036

[22] Filed: Sep. 8, 1989

Related U.S. Application Data

[63] Continuation of Ser. No. 169,372, Mar. 17, 1988, abandoned.

[30] Foreign Application Priority Data

| Mar. 24, 1987 | [JP] | Japan | 62-69998 |
| Mar. 24, 1987 | [JP] | Japan | 62-69999 |
| Dec. 15, 1987 | [JP] | Japan | 62-317223 |

[51] Int. Cl.$^5$ .............................. B29C 45/77
[52] U.S. Cl. .................. 425/145; 264/40.7; 264/294; 264/328.13; 425/171
[58] Field of Search ............ 264/40.1, 40.3, 40.5, 264/40.7, 294, 328.1, 328.7, 328.13, 328.14; 425/144, 145, 147, 149, 150, 169, 171, 542, 547, 549, 550, 589, 808

[56] References Cited

U.S. PATENT DOCUMENTS

| 3,721,512 | 3/1973 | Ma et al. | 425/149 |
| 4,060,362 | 11/1977 | Wilson, III | 425/149 |
| 4,146,601 | 3/1979 | Bishop | 425/149 |
| 4,256,678 | 3/1981 | Fujita et al. | 425/145 |
| 4,579,515 | 4/1986 | Kawaguchi et al. | 425/149 |
| 4,889,478 | 12/1989 | Sato | 425/149 |

Primary Examiner—Timothy Heitbrink
Attorney, Agent, or Firm—Koda and Androlia

[57] ABSTRACT

Products having a relatively large thickness such as optical lenses for various industrial applications are molded by an injection molding machine by advancing the screw by operating an injection cylinder for filling metered quantity of a molten resin into a metal mold. The screw is rotated while it is being advanced. A plurality of position setters are provided along the stroke of the screw and their outputs are respectively compared with the output of a screw position detector by using comparators. The outputs of the comparators are used to effect a program control of screw rotation in multistages. According to a modified embodiment, during the filling step effected by screw rotation, the injection speed is varied stepwisely. The injection speed is reduced to zero for a short interval and then increased again. The number of revolutions of the screw, however, is maintained at a constant value until the injection speed is increased again.

6 Claims, 5 Drawing Sheets

12# CONTROL SYSTEMS FOR INJECTION MOLDING MACHINES

This is a continuation of application Ser. No. 169,372 filed Mar. 17, 1988 now abandoned.

BACKGROUND OF THE INVENTION

This invention relates to a method and apparatus for injection molding, and more particularly a programmable method and apparatus for injection molding adapted to mold relatively thick products such as optical lenses for various applications.

According to a prior art method and apparatus for injection molding suitable for molding relatively thick products, the screw is rotated at its forward limit position so as to inject and fill a molten resin into the cavity of a metal mold, the shrinkage of the product is prevented and the dimensional accuracy thereof is ensured with an injection over a short stroke carried out for the purpose of pressure holding. According to another prior art method, while the screw is maintained at the most retracted position, the screw is rotated for supplementing a deficient quantity of the injected molten resin and then the screw is advanced for filling the mold cavity with the molten resin.

However, according to the first method the filling speed of the molten resin into the metal mold effected by the screw rotation is lower than that effected by the advancement of the screw so that the fluidity of the resin injected into the metal mold decreases because the injected resin comes into contact with the low temperature metal mold, thus forming weld marks or flow marks. Such tendency of forming weld marks and flow marks can be decreased by increasing the fluidity of the molten resin by increasing the mold temperature or the number of revolutions of the screw. These measures, however, elongate the cooling time as well as the molding cycle time. When the number of revolutions of the screw is increased, the resin, particularly such resin as polyvinyl chloride tending to undergo pyrolysis would be overheated to degrade the quality of the products. Furthermore, it takes a long time to fill the resin into the mold cavity so that at the time of transferring to the pressure holding step, the molten resin would solidify near the gate of the metal mold with the result that the holding pressure would not be applied to all portions of the mold cavity causing shrinkage of the molded products.

With the second prior art method, at the time of transferring to the injection operation (screw advancement) from the screw rotation, the flow of the molten resin injected into the metal mold stops momentarily so that a flow mark will be formed at that instant which impairs the optical characteristics of a lens, for example. Moreover, as the screw is rotated at its retracted position the effective screw length would be shortened substantially, thus decreasing the quantity of the resin injected. Moreover, as the molten resin is injected at a relatively low speed into the metal mold by the rotation of the screw, the thickness of the skin layer of the molded product becomes large, and since the high temperature molten resin is rapidly injected into the skin layer by the advancement of the screw, the bonding force between the injected molten resin and the skin layer is small, thus decreasing the mechanical strength of the molded product.

Furthermore, while products having a relatively large thickness are being molded by using such thermoplastic resins as hard polyvinyl chloride, acrylonitrile-butadiene-styrene copolymers which are difficult to burn, and polyoxide methylene with an injection molding machine of the type described above, when shortage or clogging of the resin occurs in a hopper, the resin would be decomposed by the heat generated by the rotation of the screw, thus resulting in products of poor quality. According to a prior art method a timer is provided which starts its time measuring operation and produces an alarm signal when an interval of screw rotation exceeds a predetermined time. However, when shortage of the resin occurs during the filling step the resin remaining in the heating cylinder undergoes heat decomposition due to the heat generated by the high speed rotation of the screw thus not only causing erosion of the inside of the heating cylinder and metal mold but also generating poisonous gas.

SUMMARY OF THE INVENTION

Accordingly, it is an object of this invention to provide a novel method and apparatus capable of producing relatively thick products free from weld marks or flow marks.

A specific object of this invention is to provide a novel method and apparatus capable of producing optical lenses having homogeneous structure and excellent optical characteristics.

A further object of this invention is to provide an improved control apparatus including means for preventing thermal decomposition of the resin when the quantity of the resin treated by the screw becomes small.

According to one aspect of this invention there is provided a method of molding products having a relatively large thickness with an injection molding machine including a heating cylinder connected to a metal mold defining therein a mold cavity, a screw contained in the heating cylinder for kneading and injecting molten resin into the mold cavity, an injection cylinder for reciprocating the screw in the heating cylinder, and means for rotating the screw, characterized in that the method comprises the steps of advancing the screw toward the metal mold with the injection cylinder for filling the mold cavity with a metered quantity of the molten resin, rotating the screw by the screw rotating means while the screw is being advanced by the injection cylinder, and program controlling rotation of the screw in multistages.

In a modification, the advancement of the screw is stopped when it reaches a predetermined position of the injection stroke, the predetermined position corresponding to a position at which a pressure holding step is started. Furthermore, the rotation of the screw is stopped when the oil pressure in the injection cylinder becomes a predetermined value or when the resin pressure in the mold cavity becomes a predetermined value.

According to another aspect of this invention there is provided a control system of an injection molding machine including a heating cylinder connected to a metal mold defining therein a mold cavity, a screw contained in the heating cylinder for kneading and injecting molten resin into the metal mold, an injection cylinder for reciprocating the screw in the heating cylinder, and means for rotating the screw, characterized in that the control system comprises means for detecting a position of the screw during an injection stroke thereof, a plurality of position setters located along the injection stroke and respectively set with predetermined positions along the injection stroke, a plurality of comparators each inputted with an output signal of the position detecting means and an output signal of one of the position setters, means responsive to the output signal of either one of the comparators, and a transfer switch responsive to an output signal of the last mentioned means for selectively controlling the injection cylinder and the screw rotating means.

DESCRIPTION OF THE PREFERRED EMBODIMENTS

Figure 1:
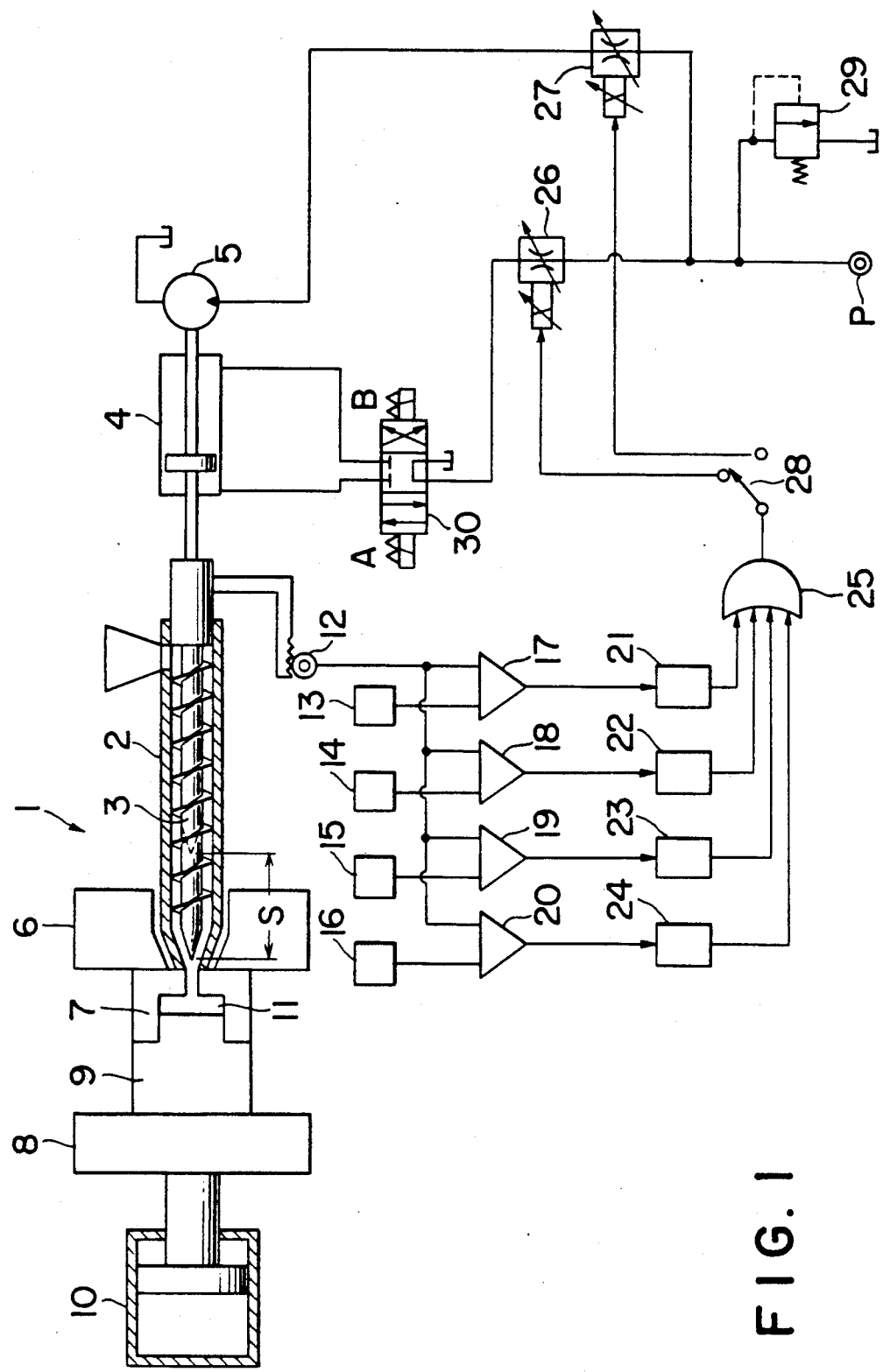
FIG. 1 is a diagrammatic representation showing a preferred embodiment of the injection molding machine and an electric control system embodying the invention.

FIG. 1 shows a conventional injection molding machine comprising a heated cylinder 2, a screw 3 reciprocated by an injection cylinder 4 over a stroke S and rotated by an oil pressure motor 5, for example, a stationary plate 6 which supports a stationary metal mold 7, a movable plate 8 which supports a movable metal mold 9 and a mold clamping cylinder 10, which when actuated in a well known manner urges the movable metal mold 9 against the stationary metal mold 7 to define a mold cavity 11 therebetween.

The electric control system shown in FIG. 1 comprises a position detector 12, in the form of a potentiometer, for example, and connected to screw 3 for detecting the longitudinal position thereof, a plurality of position setters 13-16 respectively set with any predetermined positions along the stroke S of the screw, and a plurality of comparators 17-20 respectively comparing the output signal of the position detector 12 and the output signals of the position setters 13-16. Thus, when the output signal of position detector 12 coincides with the output signal of either one of the position setters 13-16, comparators 17-20 produce coincident signals which are applied to setters 21-24 which set the injection speed or the number of revolutions of the screw. Thus, for example, when the screw passes through a position set in the position setter 13 during the injection stroke S, the injection speed or the number of revolutions of the screw becomes equal to the value set in the setter 21. The output signals of setters 21-24 are applied to the input terminals of an OR gate circuit 25, the output signal thereof being supplied to the movable contact of a manually operated transfer switch 28. The switch has two stationary contacts, one controlling the reciprocation and the injection (forward) speed of the screw, while the other controlling the number of revolutions of the screw. More particularly, the pressure of the oil outputted by an oil pump P is held at a constant value by an electromagnetic bypass valve 29 of the well known construction. The oil of the constant pressure is supplied to pressure oil motor 5 and injection cylinder 4 respectively through electromagnetic flow control valves 27 and 26. Between the injection cylinder 4 and the flow control valve 26 is connected an electromagnetic transfer valve 30. In the neutral position shown in FIG. 1 no operating oil is admitted into or discharged from the injection cylinder 4. When the lefthand electromagnet A is energized, the screw 3 is retracted (moved to the right), whereas when the righthand electromagnet B is energized, the screw 3 is advanced.

With the construction described above, a metered quantity of the molten resin is injected into the mold cavity by the rotation of the screw thus ensuring high speed filling of the resin. Moreover, as it is possible to perform a multistage program control of the injection speed and the number of revolutions of the screw, the molten resin can be filled into the mold cavity at a speed adequate for the molded product without the defects of forming weld marks and the flow marks described above.

Although in the foregoing embodiment either one of the control of the number of revolutions of the screw and the multistage control of the injection speed was selected by the transfer switch 28, it should be understood that both controls can be made at the same time, in which case the transfer switch 28 is omitted for simultaneously controlling flow quantity control valves 26 and 27 by the output signal of the OR gate circuit 25. Further, as will be described later instead of effecting the control in accordance with the screw position, the control can also be made in accordance with a timer.

As has been pointed out before, according to this invention, during the advancement of the screw while being rotated, the number of revolutions of the screw or the injection speed is changed in a multistage. In other words, the number of revolutions or the injection speed must be maintained at a constant value in each stage. More particularly, the outputs of the comparators 17-20 or the outputs of the setters 21-24 should be maintained at constant values during the output intervals between comparators 17 and 18, 18 and 19, and 19 and 20. For this reason it is necessary to connect a self-holding relay in series with the output circuit of each of the comparators 17-20 or setters 21-24. Such self-holding relay is well known in the art. For example, when the coil of the relay is energized, a self-holding circuit is established through an auxiliary contact of the relay. In the example shown in FIG. 1, the self-holding circuit is broken when a relay is connected in the output circuit of the next comparator or setter. Furthermore the OR gate circuit 25 can be substituted by a plurality of parallelly connected halfwave rectifiers each connected in series with one of the setters 21-24.

Figure 2:
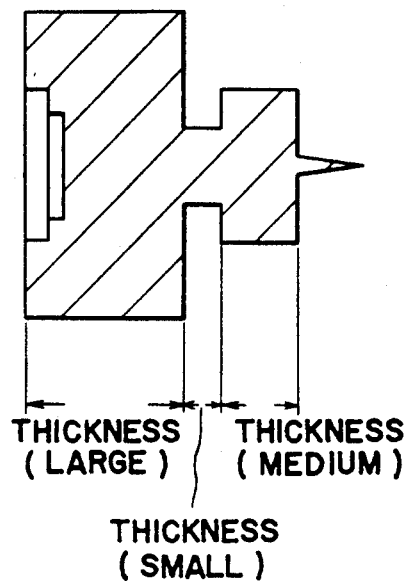
FIG. 2 is a longitudinal sectional view of a product molded with the method of this invention.

To demonstrate the advantageous effect of this invention test results will be described as follows. A product having a weight of 2000 g and a sectional configuration as shown in FIG. 2 was molded by using a mold clamping force of 350 tons and a maximum quantity of injection of 1000 g determined by the number of revolutions and the operating time of the screw. It was found that the molded lens was free from any weld mark and flow mark and had excellent optical characteristics suitable for use in various industrial fields. The invention is also applicable to other thick products than optical lenses.

Figure 3:
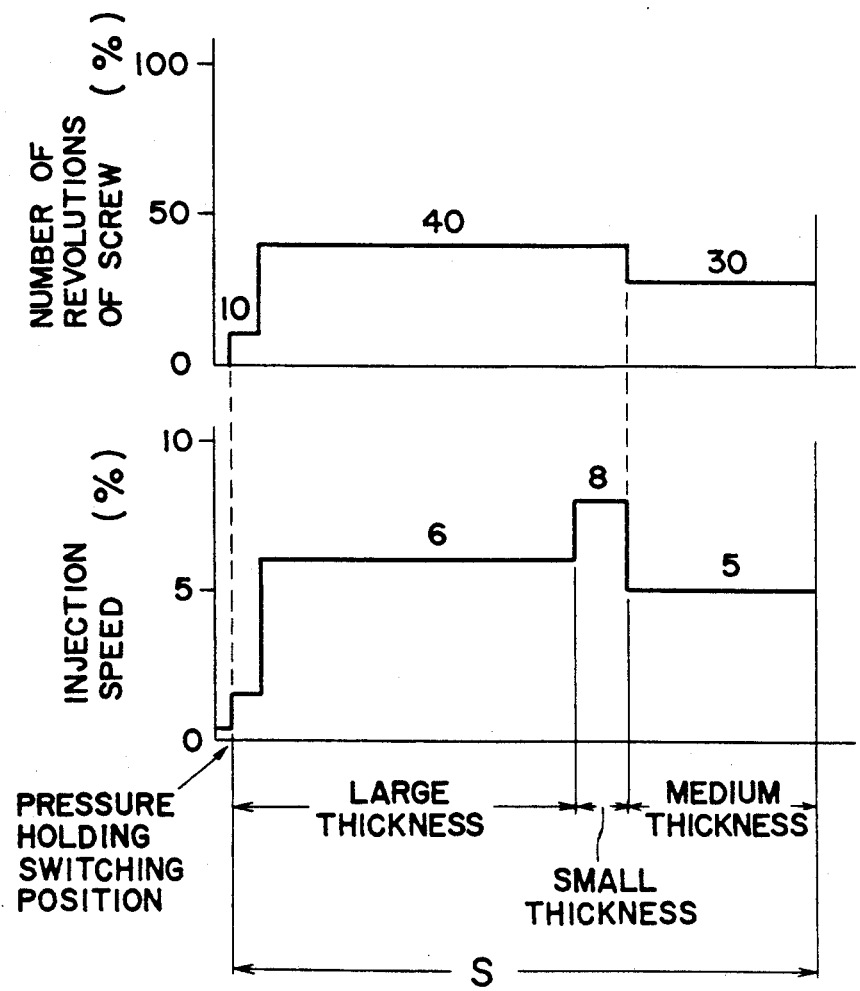
FIG. 3 are graphs showing the relationship among the stroke of the screw, the number of revolutions of the screw and the injection speed.

The relationships among the injection speed, the number of revolutions of the screw, and the position of the screw are shown by graphs depicted in FIG. 3. While the screw is advanced over the injection stroke S, the number of revolutions of the screw is reduced to about 30% of the maximum number for molding a portion having a medium thickness (righthand portion shown in FIG. 2). This reduced speed was used because of a small length to diameter ratio of the screw, in other words for ensuring a large heat quantity supplied to the resin. At the time of molding portions of the product having medium and large thicknesses, the number of revolutions was increased to about 40% for completely filling the mold cavity with the injected molten resin.

At the point of transfer to the pressure holding step, the number of revolutions and the injection speed of the screw were reduced as shown in FIG. 3. Reduction of the injection speed makes it possible to accurately transfer to the pressure holding step.

In summary, the embodiment described above has the following advantages.

1. As the filling speed of the molten resin into the mold cavity is high and as it is possible to set the injection speed to any desired value, it becomes possible to mold products having complicated configurations and relatively large thickness without forming weld marks and/or flow marks.

2. Since it is possible to obviate the prior art defects caused by the fact that the high temperature molten resin is injected into a thick skin layer formed in the mold caused by the low speed injection of the molten resin into the mold cavity during the initial molding step, the molded product becomes homogeneous thereby increasing its mechanical strength.

3. As it is not necessary to increase the number of revolutions of the screw, such material as polyvinyl chloride that decomposes readily can be molded satisfactorily.

Figure 4:
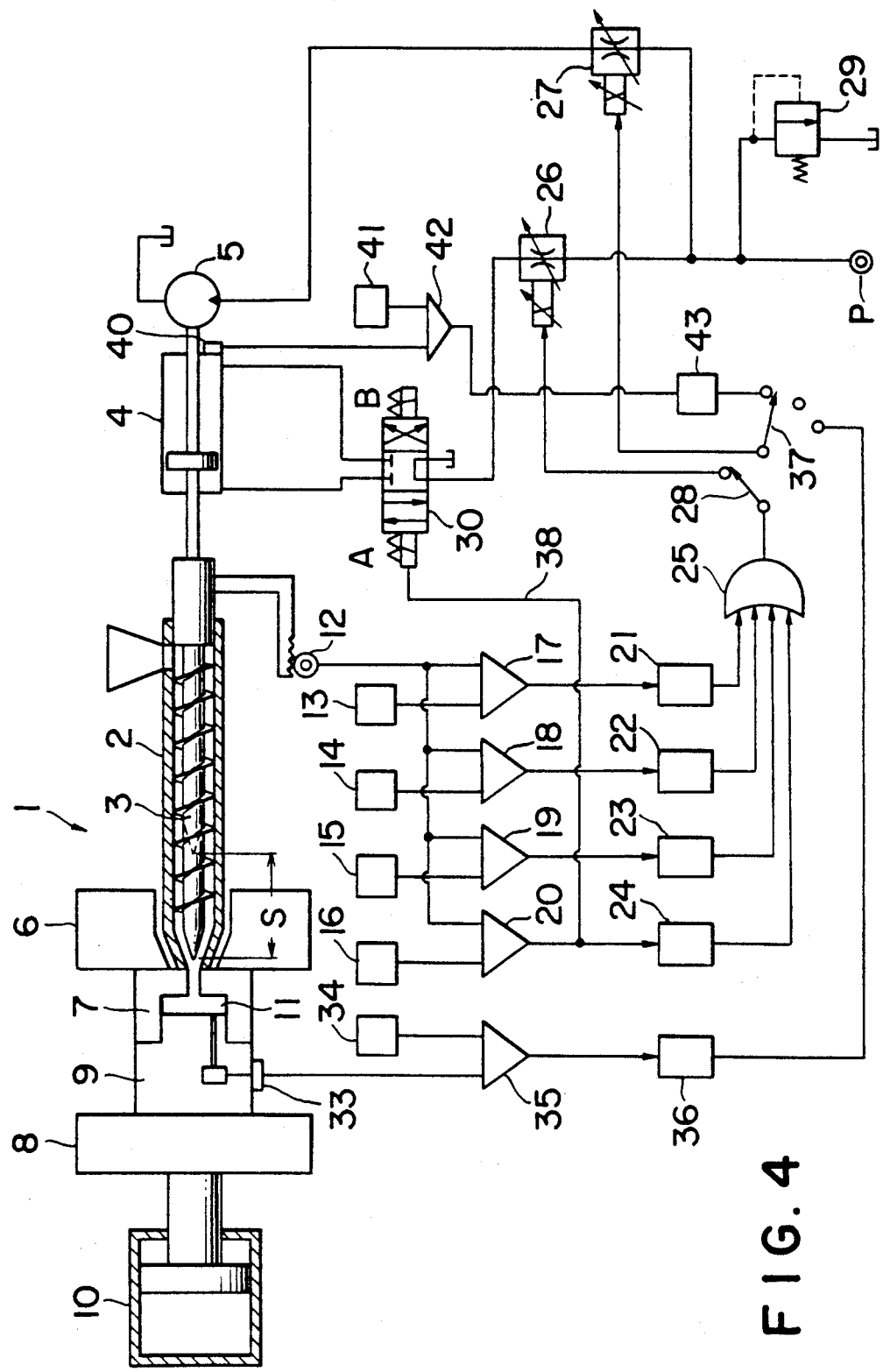
FIG. 4 shows a modified embodiment of this invention.

FIG. 4 shows a modified embodiment of this invention in which elements identical to those shown in FIG. 1 are designated by the same reference characters so that only the elements added to FIG. 1 will be described.

More particularly, an oil pressure detector 40 is provided for the injection cylinder 4 for detecting the pressure of the oil utilized to advance the screw 3. The output signal of the oil pressure detector 40 is compared with the output signal of an oil pressure setter 41 for the injection cylinder 4 by a comparator 42 which produces an output signal when signals from the oil pressure detector 40 and the oil pressure setter 41 coincide with each other. The output signal of the comparator 42 is sent to a setter 43 which is used to stop the operation of the oil motor 5 when the injection pressure reaches a set value. At this time the movable contact of a transfer switch 37 is thrown to its upper stationary contact to close the flow control valve 27.

As the screw is advanced and the position detector 12 reaches a position corresponding to position setter 16, the output signal 38 of comparator 20 is also supplied to the electromagnetic transfer valve 30 to bring it to the neutral position, at which both electromagnetic coils A and B are not energized. There are also provided a cavity pressure detector 33 which detects the internal pressure of the mold cavity 11, a mold cavity pressure setter 34 which sets a predetermined internal pressure of the mold cavity 11, a comparator 35 which compares with each other the output signals of the cavity pressure detector 33 and the mold cavity pressure setter 34 for producing an output signal, and a setter 36 responsive to the output signal of the comparator 35 for stopping the operation of the oil motor 5, that is for transferring the transfer switch 37 to the upper position.

As above described according to one aspect of this invention, when the screw reaches a predetermined position in the injection stroke while being rotated, the advancement of the screw is stopped and the rotation of the screw is continued.

Figure 5:
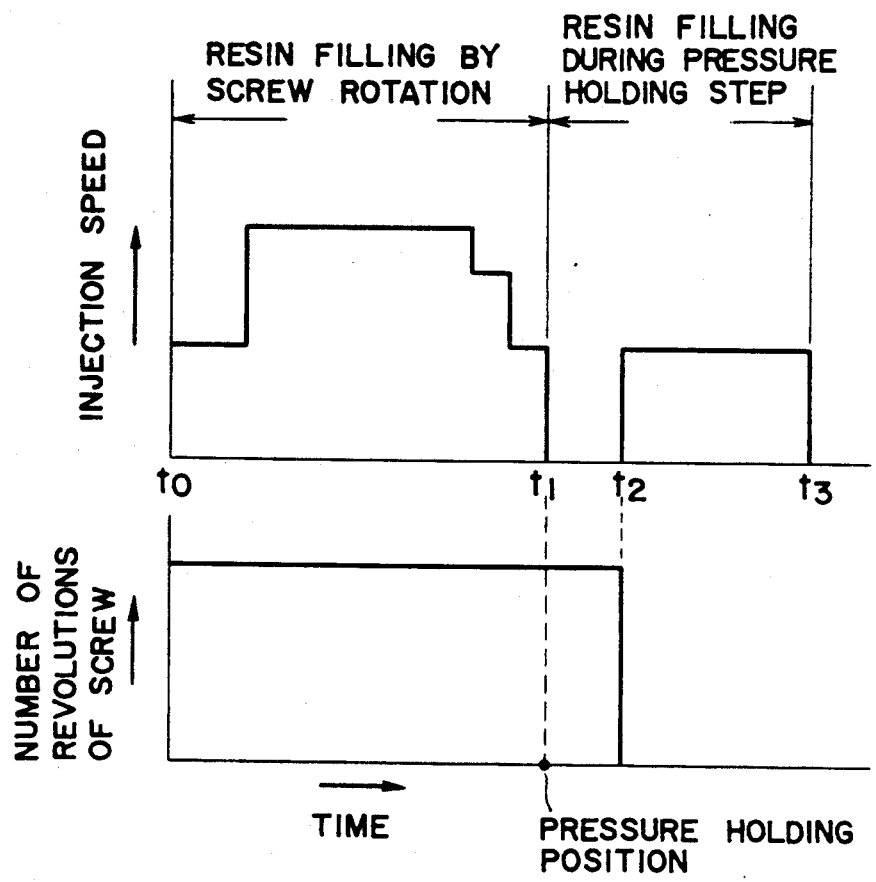
FIG. 5 shows graphs showing relationships among time, the injection speed and the number of revolutions of the screw.
Figures 6A, 6B:
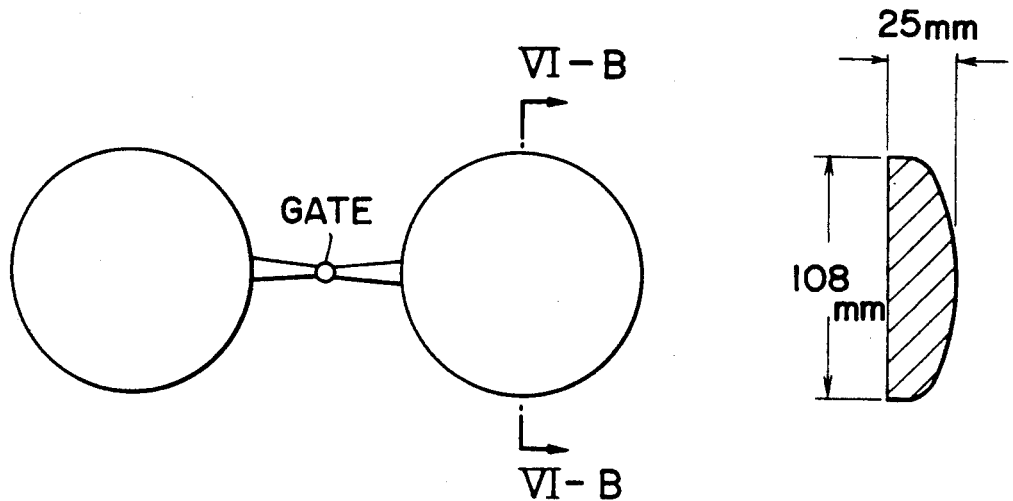
FIG. 6A is a plan view showing two lenses molded at the same time.
FIG. 6B is a sectional view of one lens taken along a line VI-B - VI-B in FIG. 6A.

This operation will now be described with reference to FIGS. 4–6. The upper graphs shown in FIG. 5 show the relationship between time and injection speed during the resin filling step by the screw rotation and the resin filling during the pressure holding step. During an interval between $t_0$ and $t_1$, the injection speed is varied stepwisely, while the number of revolutions of the screw is maintained at a constant value. During the interval between $t_1$ and $t_2$, the injection speed is reduced to zero (that is, the advancement of the screw is stopped) but the number of rotations of the screw is not changed. At and after time $t_2$ the rotation of the screw is stopped and a relatively low injection speed is resumed and continued until time $t_3$ determined by the quantity of the resin to be filled during the pressure holding step. Two optical lenses each having a diameter of 108 mm, a thickness of 25 mm, and a weight of 200 g were molded through a common gate. At this time, mold clamping force was 220 tons and the maximum injection quantity was 230 g. It was found that the molded lenses had excellent optical characteristics and free from any weld mark and flow mark.

This modified embodiment has the following advantages.

(1) Since the filling speed of the molten resin into the mold cavity is high, the speed can be set to any desired value, and since the resin pressure in the metal mold and the oil pressure in the injection cylinder are detected, filling of the resin into the metal mold can be controlled as desired by controlling the number of revolutions of the screw as well as the advance stroke of the screw so that relatively thick products can be obtained without such defects as the weld marks and flow marks.

(2) Since the flow of the molten resin in the metal mold is not interrupted (see FIG. 5) homogeneous products having a relatively large thickness can be obtained.

(3) Since it is not necessary to increase the number of revolutions of the screw, there is no fear of overheating the resin which results in the charring.

(4) It is possible to decrease the time of molding cycle.

(5) It is possible to use a molding machine of small size and capacity for molding relatively large products having considerable thickness and such various resins as propylene, polyethylene, acrylonitryl-butadiene-styrene copolymers, rigid (hard) polyvinyl chloride, etc.

Figure 7:
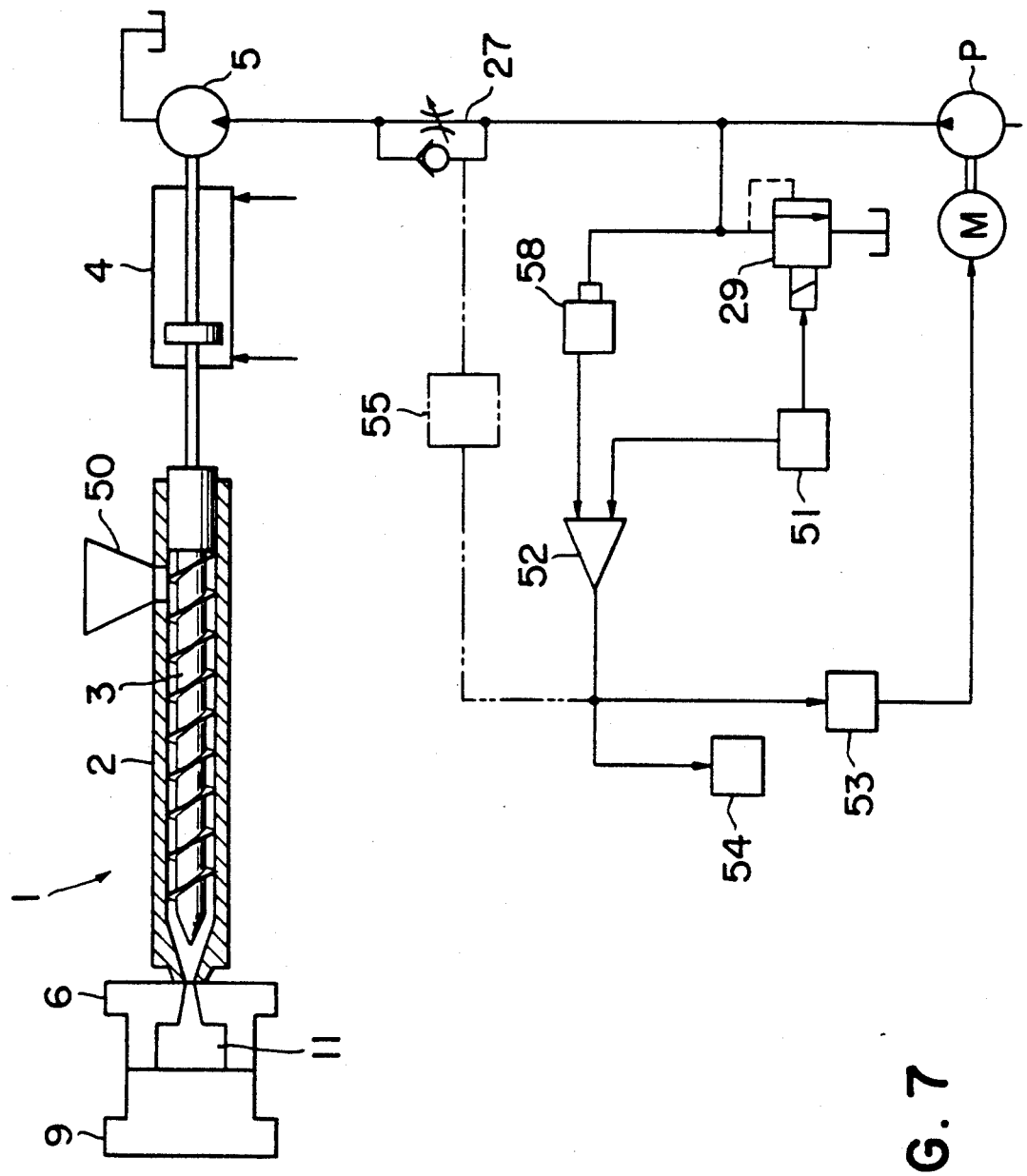
FIG. 7 is a connection diagram showing a control system for preventing heat decomposition which can be used in combination with that shown in FIG. 1 or FIG. 4.

FIG. 7 shows a control circuit for preventing heat decomposition of the resin, which can be added to the control system shown in FIG. 1 or 4. In FIG. 7, essential elements of the injection molding machine corresponding to those shown in FIG. 4 are designated by the same reference characters. The control circuit for preventing heat decomposition of the resin remaining in the heating cylinder which occurs when the quantity of the resin supplied from a hopper 50 into the heating cylinder 2 becomes deficient comprises an oil pump P driven by an electric motor M, a pressure relief valve 29 which acts to maintain the oil pressure at a constant value, and an electromagnetic flow control valve 27 connected between pump P and an oil motor 5 adapted to rotate the screw 3. There are provided an oil pressure detector 58, a pressure setter 51 which sets the pressure of the relief valve 29, a comparator 52 which compares the output signal of the pressure detector 58 with the output signal of the pressure setter 51. The comparator 52 produces an output signal when the output signals of the pressure detector 58 and pressure setter 51 coincide with each other, that is when the oil motor 5 is operated under a condition wherein the oil pressure detected by the oil pressure detector 58 is lower than the pressure set in the pressure setter 51. The output signal of the comparator 52 is sent to a pump stop signal generator 53 and an alarm signal generator 54 whereby the operation of the pump P is immediately stopped by sensing the pressure drop caused by the deficiency of the resin in the heating cylinder thus preventing heat decomposition of the resin in the heating cylinder. If desired a screw revolution number setter 55 may be connected between the output side of comparator 52 and the flow control valve 27 as shown by dotted lines. The setter 55 is set with a number of revolutions of the screw which is slightly lower than the normal number of revolutions of the screw. With this connection, the load decrease of the screw caused by the deficiency of the resin can be detected by the pressure drop of the oil motor so as to immediately stop the oil pump P. As a consequence, heat decomposition of the resin and generation of harmful gas can be prevented.

What is claimed is:

1. A control system of an injection molding machine for molding a molten resin and including a heating cylinder connected to a metal mold defining therein a mold cavity, a screw coaxially contained in said heating cylinder for kneading and injecting said molten resin into said metal mold cavity through a first end of said heating cylinder, an injection cylinder connected to said screw on a second end of said heating cylinder for reciprocating said screw in said heating cylinder, and means connected to said injection cylinder for rotating said screw, said control system comprising:

means (12) for detecting a position of said screw during an injection stroke thereof;

a plurality of position setters (13-16) located along said injection stroke and respectively set with predetermined positions along said injection stroke;

a plurality of comparators (17-20), each comparator inputted with an output signal of said position detecting means (12) and an output signal of a corresponding position setter for producing a coincident signal when said output signal of said position detecting means and a signal from a corresponding position setter coincide with each other;

means (25) responsive to the coincident signal of any one of said comparators;

a plurality of setters (21-24) each connected to receive an output signal from a corresponding comparator (17-20) for setting an injection speed or a number of revolutions of said screw;

a transfer switch (28) responsive to any one of the output signals received by said setters (21-24) for selectively controlling said injection cylinder and said screw rotating means and electromagnetic flow control valves (26)(27) controlled by said transfer switch for controlling the injection speed of said screw or the number of revolutions of said screw; and means for continuing rotation of said screw during advancement caused by said injection cylinder; and wherein said position detecting means (12), said plurality of position setters (13-16), said plurality of comparators (17-20), said means responsive to the coincident signal (25), said plurality of setters (21-24), said transfer switch (28) and said means for continuing rotation of said control system are connected to perform multistage program control of the injection speed or the number of revolutions of the screw.

2. The control system according to claim 1 wherein said means responsive to the output signal of any one of said comparators comprises an OR gate circuit.

3. The control system according to claim 1 which further comprises an electromagnetic transfer valve connected between said injection cylinder and an oil source of constant pressure, said electromagnetic transfer valve having a first position at which oil from said oil source is admitted to a first side of a piston of said injection cylinder, a second position at which said oil is admitted to a second side of said piston opposite said first side, and a third position at which said piston is held at a neutral position.

4. The control system according to claim 3 wherein means (38) is provided for applying the output signal of a comparator (20) of said plurality of comparators (17-20) corresponding to a forward end of said stroke to an electromagnet (A) of said electromagnetic transfer valve for moving said piston rearwardly.

5. The control system according to claim 1 further comprising an oil pressure detector for detecting oil pressure in said injection cylinder, an oil pressure setter for setting a predetermined oil pressure, another comparator for comparing an output signal of said oil pressure detector with an output signal of said setter, a resin pressure detector for detecting a resin pressure in said mold cavity, a pressure setter for setting a predetermined resin pressure in said mold cavity, a resin pressure comparator for comparing an output signal of said resin pressure detector with an output signal of said resin pressure setter, and a further transfer switch (37) for selectively applying both an output signal of said resin pressure comparator and an output signal of said oil pressure comparator to a flow control valve connected between said screw rotating means and a source of constant pressure oil.

6. The control system according to claim 1 further comprising circuit means for preventing heat decomposition of said resin, said circuit means including a pressure detector (58) for detecting a pressure of oil used to actuate said screw rotating means, a setter (51) preset with a predetermined oil pressure, and comparator means (52) responsive to output signals of said pressure detector and said setter for stopping a source of oil pressure.

* * * * *